(12) United States Patent
Raynor

(10) Patent No.: US 8,405,607 B2
(45) Date of Patent: Mar. 26, 2013

(54) OPTICAL NAVIGATION DEVICE AND ASSOCIATED METHODS

(75) Inventor: Jeffrey Raynor, Edinburgh (GB)

(73) Assignee: STMicroelectronics (Research & Development) Limited, Marlow-Buckinghamshire (GB)

(*) Notice: Subject to any disclaimer, the term of this patent is extended or adjusted under 35 U.S.C. 154(b) by 182 days.

(21) Appl. No.: 13/073,054

(22) Filed: Mar. 28, 2011

(65) Prior Publication Data

US 2011/0291924 A1 Dec. 1, 2011

(30) Foreign Application Priority Data

May 25, 2010 (GB) .................................. 1008687.4

(51) Int. Cl.
*G09F 3/033* (2006.01)
*G09G 5/08* (2006.01)

(52) U.S. Cl. .......... 345/157; 345/81; 345/166; 345/175; 345/207; 345/697; 250/216; 250/221; 178/18.09; 178/19.05

(58) Field of Classification Search .................... 345/81, 345/157, 163, 165, 166, 175, 204, 207, 697; 250/216, 221; 178/18.09, 19.05
See application file for complete search history.

(56) References Cited

U.S. PATENT DOCUMENTS

| 7,502,061 | B2 | 3/2009 | Raynor .................. 348/308 |
| 2003/0006948 | A1* | 1/2003 | Son et al. ................ 345/87 |
| 2004/0246242 | A1* | 12/2004 | Sasaki ................... 345/204 |
| 2005/0127278 | A1 | 6/2005 | Cok ...................... 250/214 |
| 2008/0043223 | A1 | 2/2008 | Kwak et al. ............. 356/72 |

FOREIGN PATENT DOCUMENTS

WO WO2010056177 5/2010

* cited by examiner

*Primary Examiner* — Lun-Yi Lao
*Assistant Examiner* — Insa Sadio
(74) *Attorney, Agent, or Firm* — Allen, Dyer, Doppelt, Milbrath & Gilchrist, P.A.

(57) ABSTRACT

A sensor for an optical device includes an array of pixels in rows and columns which detect and process illumination falling thereon so as to identify inputs generated by a user on a surface of the optical device. A second reset period of variable length between a black calibration phase and an integration phase occurs in a processing cycle of a frame for each pixel, wherein the length of the second reset period is adjusted based on the ambient light conditions.

24 Claims, 4 Drawing Sheets

OPTICAL NAVIGATION DEVICE AND ASSOCIATED METHODS

FIELD OF THE INVENTION

The present invention relates to improvements in or relating to optical navigation devices such as, for example, an optical mouse when being operated in high ambient light conditions.

BACKGROUND OF THE INVENTION

Computer devices are becoming ever smaller and full computing functionality can be found on phones and smart phones and other personal digital assistants (PDAs). As the computer devices become smaller so the various features of the computer devices also become smaller. This includes a condition for smaller input systems for the user to enter inputs into the device. One such input system is an optical navigation device. Many computer devices, large and small, are equipped with optical navigation devices, such as a mouse. However, with the smaller computer devices, reducing the size of the optical navigation device can often be restrictive and problematic.

One problem which remains unresolved is the lighting levels of optical navigation devices when operating in high ambient light conditions. In a PC a mouse is usually operated pointing towards a surface (e.g. a desk, mouse mat, etc.) as a result little stray or ambient light reaches the sensor. However, in a fingermouse on a mobile phone the mouse surface usually points upwards and as a result can receive a large amount of ambient stray light or sunlight.

Levels of sunlight can vary depending on weather, the location (latitude) of the user, seasons, etc. It is not uncommon for the levels of sunlight to exceed the dynamic range of existing mice sensors resulting in a saturated image on the sensor. If all the pixels are saturated or "clipped" it is not possible to recognize any movement or finger ridges on the mousing surface and as such the optical navigation function does not function. This is a severe problem for a mobile or smart phone as the user is not able to access any navigational aids, such as icons, lists etc. in high ambient light levels.

A number of approaches to the problem of high ambient light levels and the saturation of the sensor have been proposed. These include optical filtering; electronic exposure control; offset compensation; pixel skimming; and digital pixel offset cancelation techniques.

Optical filtering includes adding a filter to the fingermouse module which will stop or attenuate visible light but pass infrared light. Due to the nature of sunlight certain energy bands pass through the filter and are detected by the sensor, leading again to saturation of the pixels and prevention of operation of the fingermouse. This can be improved by carefully controlling and selecting the cut-off wavelength of the filter. However, this does not completely address the problem.

Electronic exposure control is a common technique used in CMOS sensors where the pixel is controlled with respect to how much time the pixel is sensitive to light. This is done by controlling the time the pixel is in the reset state. In high light levels the pixel is kept in "reset" for a longer duration resulting in a short integration period and under low light levels the pixel is kept in "reset" for a shorter duration resulting in a long integration time. While this is generally acceptable for image sensors, the technique causes problems for a fingermouse. This is due to the fact that the mouse sensor has a "global shutter", where all pixels are exposed and read-out simultaneously to avoid distortion of the image due to movement on the sensor. Further, a low-voltage operation of some mice sensors causes problems with offsetting. Both of these aspects may hinder standard operation of electronic exposure control in a fingermouse.

CMOS sensors commonly adopt techniques to compensate for offset. Typically, these operate by taking one "dark" measurement when the pixel is in a reset mode and another with the image exposed and comparing the measurements. Systematic offsets are common to both measurements, so by subtracting the two measurements, the offsets are removed. This technique is generally referred to as "Double Sampling". There are two variants of double sampling, namely correlated double sampling (CDS) and double sampling (DS). CDS takes the first measurement just after the pixel has come out of reset (i.e. at the start of the integration cycle) and the second measurement at the end of the integration cycle. The disadvantage of this scheme is that it requires the storage of the "dark" measurement for a long period such as one whole frame. This may require the need for a frame store or other similar storage devices which adds to the cost of implementation and is undesirable.

A pixel in a mouse is typically of the order of 30 μm×30 μm and as such is relatively large for a pixel. This is necessary as a mouse needs to operate at high frame rate and therefore needs to collect more light to obtain a reasonable signal. As a result, fully depleted 4T photodiodes are not practical for optical mouse sensors. Even without reset noise from the photodiode, 4T pixels still suffer from offsets and reset noise from other capacitors in the readout chain (notably the sense node capacitance) and employ DS/CDS techniques to overcome these. This would not be satisfactory in a fingermouse for the reasons discussed above.

Pixel skimming is a technique to increase the intra-scene (single image) Dynamic Noise Reduction (DNR) of a pixel and only works with pixels having a transfer gate (i.e. "4T" architecture) as it relies on pulsing the gate to a predetermined value to partially reset the signal on the photodiode. As described earlier, this technique is not available to larger pixels, such as those found on a fingermouse. Variants of this technique apply multiple skimming pulses per image although only some pixels (those with high light levels) are reset.

A currently used technique known as digital pixel offset cancellation is disclosed in U.S. Pat. No. 7,502,061 and is described with reference to FIG. 1. In a PC mouse, the LED on time is changed to control the exposure. On a fingermouse, this technique works very well with low or normal lighting conditions. However, under high levels of ambient light, most of the light on the sensor is from the sun and thus reducing the LED on time to zero does not prevent the pixel from saturating.

Ideally, the integration period ((A) in FIG. 1) should be reduced, however it is not possible to reduce the integration time (A) below the time it takes for the "blackcal" data to be read out (B). This is due to the fact that the (reset) data stored in the pixel analog to digital converter (ADC) would otherwise be over-written by data from the analog-digital conversion of the integrate phase ("Convert" in FIG. 1). To avoid this, it would be necessary to add an extra storage capability to the array, this would require a significant amount of space and as a result would increase the cost, which would be undesirable.

SUMMARY OF THE INVENTION

It is an object of the present invention to overcome at least some of the problems associated with the prior art discussed above. It is a further object of the present invention to provide an optical navigation device which can cope with high ambient light conditions and which is adapted to avoid as much saturation of pixels as possible.

According to one aspect of the present invention there is provided a sensor for an optical device; wherein the sensor includes an array of pixels in rows and columns which detect and process illumination falling thereon so as to identify inputs generated by a user on a surface of the optical device; wherein a second reset period of variable length between a black calibration phase and an integration phase occurs in a processing cycle of a frame for each pixel; and wherein the length of the second reset period is adjusted based on the ambient light conditions.

The present invention offers a number of benefits. The present invention increases the inter-scene (multiple images) dynamic noise reduction (DNR) of the pixel. In addition, every pixel in the array is reset at the same time thereby increasing the DNR and preserving the "global shutter" feature which is essential for mouse operation.

BRIEF DESCRIPTION OF THE DRAWINGS

Reference will now be made, by way of example, to the accompanying drawings, in which.

DETAILED DESCRIPTION OF THE PREFERRED EMBODIMENTS

The present invention relates to an imaging device associated with an optical navigation device. The optical navigation device is a mouse of small-scale which is intended to be operated via either standard imaging where light is reflected from a finger or frustrated total internal reflection (F-TIR) to recognize the movement of a finger on an imaging surface. This type of mouse is herein referred to as a fingermouse.

Figure 2:
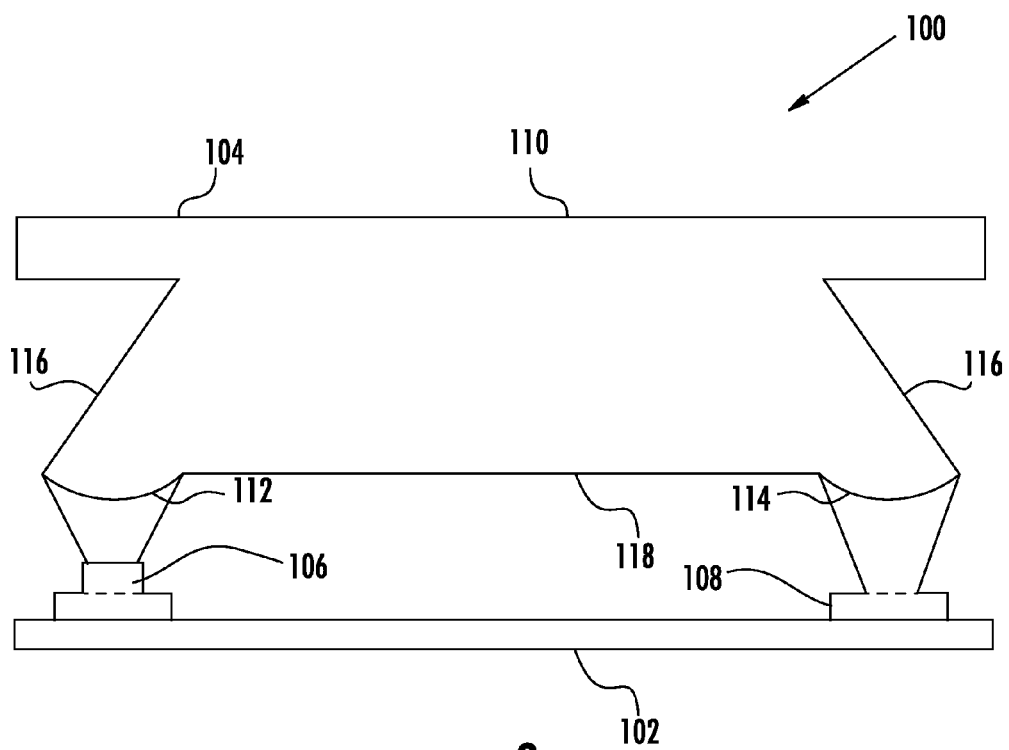
FIG. 2, is a schematic diagram of a fingermouse, in accordance with an embodiment of the present invention.

FIG. 2 illustrates an example of a conventional fingermouse 100 as is known in the prior art. The fingermouse includes a base 102; an imaging element shown generally at 104; an LED 106 and a sensor 108. The top surface 110 of the imaging element 104 is a frustrated total internal reflection (F-TIR) surface. In addition, the imaging element includes a collimating lens 112 between the LED and the imaging element and an imaging lens 114 between the imaging element and the sensor. The imaging element further includes two total internal reflection mirror elements 116 which direct illumination from the collimating lens to the frustrated total internal reflection surface and then from the frustrated total internal reflection surface to the imaging lens. The lower surface 118 of the imaging element is substantially flat. This is just one example of a optical mouse and many variations may be implemented without diversifying from the basic principles of operation thereof.

In use, a user may move a pointer over the upper surface 110, also referred to as the mousing surface. The pointer may be simply the user's finger which passes over the surface. The finger includes fingerprint ridges which can be detected to identify the movement being made. In high ambient light conditions the movement is hard to measure hence the need for the sensor arrangement of the present invention, which addresses the problems of monitoring movement of a finger on a mousing surface in high ambient light conditions and increases the DNR.

The distance between the mousing surface and the first LED or sensor in the present embodiment is in the region of 2.5 mm, for example. This distance is the thickness of the imaging device and can vary between 1 mm and 3 mm. Ideally the thickness is not generally greater than 5 mm. The imaging device can be formed from a single piece molding. The molding includes each of the individual optical elements shown in the diagrams. The imaging device could alternatively be made in other appropriate ways with different optical elements which produce the same optical effect. The imaging device may also be made from a number of different elements, rather than a single molding. The technique for forming the imaging device may include techniques other than molding, such as replication, stamping, embossing or machining.

The illumination sources are, for example, LEDs which may be of any appropriate type and may generate a source in the "optical" or non-optical ranges. Accordingly, reference to optics and optical are intended to cover wavelengths which are not in the human visible range. The optics which takes the illumination from the source to the imaging surface may be of any appropriate type.

The sensor will now be described in greater detail. The sensor may be a CMOS sensor having an array of pixels for measuring reflected light at different locations to produce an image. The array is generally formed from a number of pixels forming a grid like array with pixels extending in rows and columns.

Figure 3:
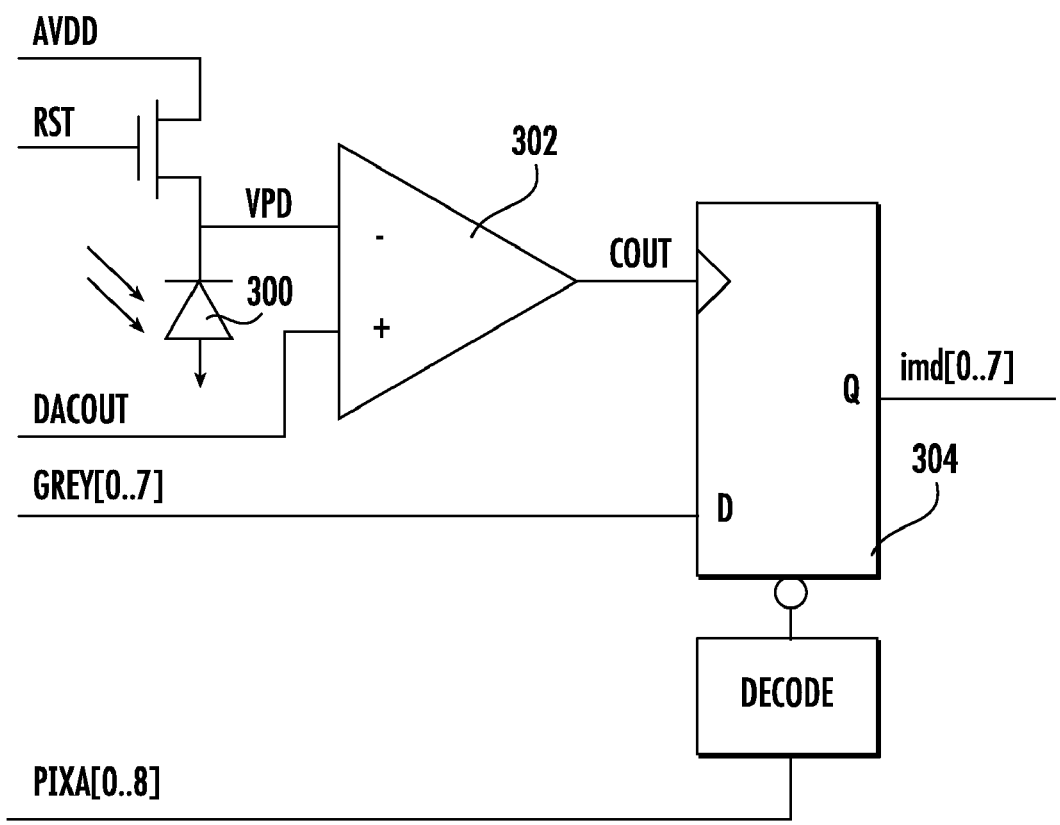
FIG. 3 is a schematic diagram of a pixel circuit in the sensor of FIG. 2, in accordance with an embodiment of the present invention.

Referring to FIG. 3 an example of a pixel circuit is shown. The circuit includes a photodiode 300 which detects the illumination incident on the sensor, a reset transistor a comparator 302 and a latch or SRAM cell 304. After pixel reset, the voltage VPD is higher than the ramp voltage DACOUT and so the output from comparator 302 is low. When light falls on the photodiode, electron-hole pairs are generated, causing the voltage on the cathode of the photodiode to decay. The voltage DACOUT is generated by a digital to analog converter (DAC) where the digital data is incremented sequentially. The digital data is usually connected to both the DAC and the input of the latch (304). To increase the immunity of the system to skew on the bitlines of the data bus, the DAC digital data is grey-encoded before connection to the input of latch (304). Typically, after illumination the voltage DACOUT is ramped by increasing the digital code and when the voltage from the DAC and the voltage VPD on the photodiode are equal, the output from the comparator changes from low to high and so the digital data GREY[0 . . . 7] is stored in the latch (304). Hence the data stored in the latch (304) is a digital conversion of the voltage VPD.

Figure 4:
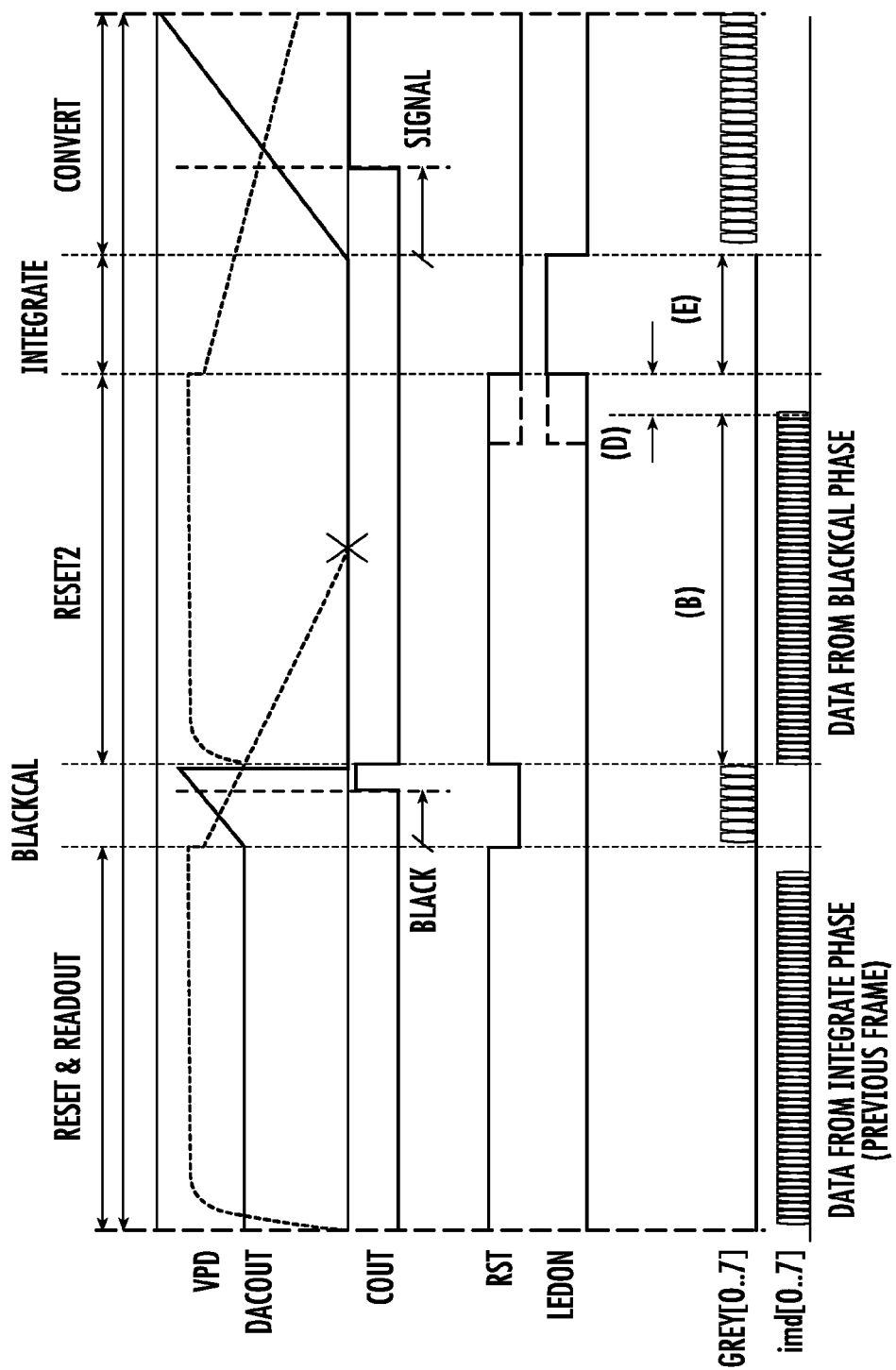
FIG. 4 is a timing diagram, in accordance with an embodiment of the present invention.

To deal with the problem of saturated pixels and increasing DNR, the present invention proposes a method of analyzing the pixel outputs based on the timing diagram of FIG. 4. One important part is to reset every pixel twice during each frame and to read out and preferably convert to a digital value every pixel twice during each frame. This is achieved by incorporating of an extra reset phase to the pixel. This is referred to as "Reset2" in FIG. 4. The width of Reset2 is varied depending on the amount of sunlight on the sensor. The minimum width of Reset2, is the same as the period (B) i.e. the readout of data from the Blackcal phase. By increasing the time for the Reset2 period, the time for integration (E) is reduced, which in turn will reduce the sensitivity of the system to light.

The function of the sensor will now be described in greater detail with reference to the time in the diagram for each pixel. Initially there is a reset and readout phase during which the pixel is reset by the signal (RST) on the gate of the reset transistor. At the same time data from the previous frame integration phase is readout (imd [0-7]). The next phase is a blackcal phase where the LED is off and the voltage on the pixel (VPD) is measured. A voltage is produced via ambient light falling on the pixel. The slope of descent of the blackcal phase can be seen to be descending such that the VPD would cross the DACout level before the end of an integrate phase were the integrate phase to be the same as that shown in FIG. 1. The crossover point (X) indicates where the pixel would become saturated. This is due to the high level of ambient light for a fingermouse which is generally operating with the mousing surface pointing upwards towards the ambient light.

Figure 1:
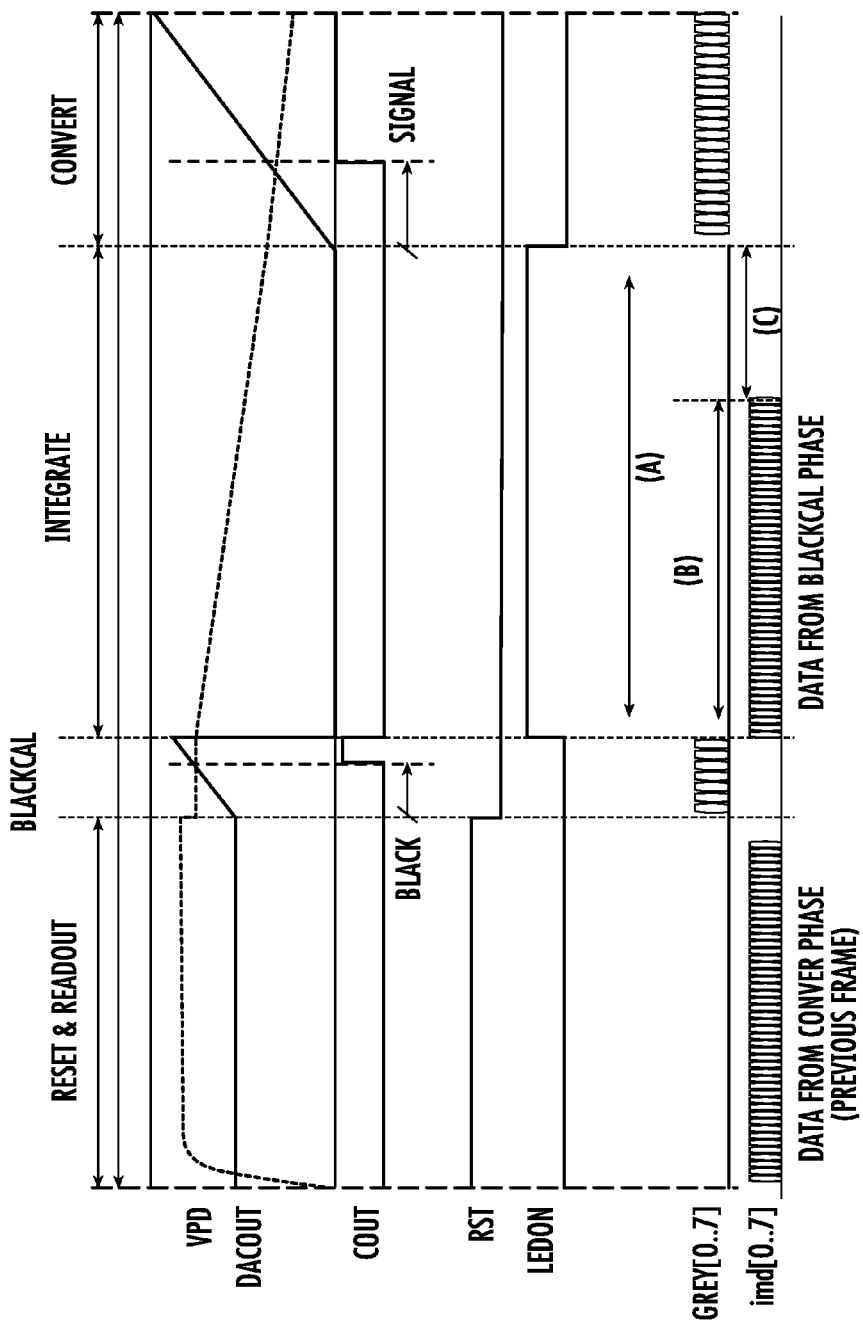
FIG. 1 is a timing diagram for an existing optical mouse, in accordance with the prior art.

As a result of this expected impending saturation of the pixel (in what would have previously been the integration phase as shown in FIG. 1) the present embodiment provides a second reset phase reset2 during which time (B) the data from the blackcal phase is readout (imd [0-7]). The next phase is an integration phase where the LED is switched on and the photodiode voltage decay based on ambient light reflection and reflection of any pointer in contact with the mousing surface is determined. The comparison between the blackcal measure and the integration measure will thus give an indication of the illumination reflected from an appropriate pointer.

The integration phase is an automatic exposure during a time (E) where the value of (E) can be varied dependent on the light conditions. The manner in which (E) is adjusted is set out below. During period (E) the decay on the photodiode is measured to determine the image of a finger or pointer and the movement thereof. Then a convert phase is carried out which ends in a return to the first reset and readout phase for the next frame.

The value of the integrate period is adjustable from one frame to the next based on the ambient light levels. The value of the decay slope during the integration phase is measured by looking at the value for the previous frame. If the slope is too steep the integration time (E) is reduced for a following frame. If the slope is too shallow the integration period may be extended. There are other manners in which the period (E) can be varied and the above example of measuring slopes is just one.

Alternatively, the width of the reset can be adjusted if RST goes low and LEDON goes high at the end of Reset2 (400). In very bright ambient light, the integration time (E) may be very short. As a result changes to the Reset2 period are desirable.

The slope of the photodiode (VPD) in FIG. 4 is greater than that of the same slope in FIG. 1. This is due to the higher light levels on the sensor producing a greater photocurrent and hence greater rate of voltage decay (Iphoto=Cphotodiode× dVPD/dt). This decay in VPD in FIG. 4 continues beyond the "Integrate" period and into the "Conversion" phase. This is due to the fact that sunlight is approximately constant over the 1 ms frame and there is no way of either shutting off the sunlight (e.g. via a mechanical shutter on the pixel) nor for using a sample-hold circuit, as this may be prohibitively expensive or generate extra noise. A way to mitigate this is to measure the pixels with the highest light levels first as these would be the first to saturate. This is achieved by ramping the voltage (DACOUT) in an opposite sense to that of the voltage decay (VPD) produced by the photo-current.

Preferably, the frame rate in FIG. 1 of the system is not changed with this technique. The length of the various periods in the FIG. 1 and FIG. 4 examples are equal. In other words:

$(A)=(B)+(C)$ {FIG. 1}$=(B)+(D)+(E)$ {FIG. 4}.

Keeping the frame rate constant in this way is particularly advantageous for an optical mouse as constant object motion is easier to track than varying motion. If the frame rate changes, this can appear to the navigation engine to be the same as varying motion.

It is possible to run the system entirely in the timing mode as shown in FIG. 4, however it is desirable to operate in two modes: a "Sunlight Mode" and a "Normal Mode". The maximum integration time in "Sunlight Mode" is less than that in "Normal Mode" and can be set accordingly.

There are various ways of determining when to switch between "Sunlight" and "Normal" modes. One is that if the image intensity (i.e. either maximum pixel or mean pixel) is greater than a first predetermined threshold while in "Normal Mode", then the system will switch to "Sunlight Mode". If the image intensity (i.e. either maximum pixel or mean pixel) is less than a second predetermined threshold while in "Sunlight Mode" then the system will switch to "Normal Mode". Ideally the two thresholds are not the same value and are set to provide hysteresis in the system, so that a small change in scene illumination or noise does not cause the system to switch between the two modes.

The system selects which mode based on the levels measured in the previous integration phase as above described with reference to FIG. 4.

An alternative method to determine when to switch between the "Sunlight" and "Normal" modes is to use the value from the automatic exposure control (AEC) system of the system. If the system is in "Normal Mode" and the AEC system tries to reduce exposure below a certain threshold, then it will switch to "Sunlight Mode" and conversely, if the system is in "Sunlight Mode" and the period (D) is reduced to 0, then the system will switch back into "Normal Mode".

An example of how the system can switch from "Normal Mode" to "Sunlight Mode" and vice versa, will now be described. If the time for which LEDON is on is less than a first predetermined threshold then the system will switch from "Normal Mode" and "Sunlight Mode". The first predetermined threshold is determined based on the exposure value. Under normal fingermouse operation, the exposure value is typically 128-255 (6 MHz). Hence a count of say 32 counts would indicate that the pixel is near saturation with very little light from the LED. If the length of period E is greater than the second predetermined threshold, then the system will switch from "Sunlight Mode" to "Normal Mode". This second predetermined threshold is harder to determine as the level of sunlight is more variable to the level of LED light.

Accordingly this value may be selected based on the first predetermined threshold and the need for hysteresis. A value of 128 counts should ensure a reasonable level of hysteresis. The count values presented above are examples and it will be appreciated that other values could be determined based on the system, light conditions and various other factors. It should be noted that the slope of the VPD line after the LED goes off is reduced as the measured output relates only to ambient light, not LED light and ambient light as is the case when the LED is on.

The imaging device is intended for use in an optical navigation device; however it will be appreciated that the imaging device could be used in any appropriate device, for example fingerprint reader or Lab-on-chip/Bio-Optical sensor systems (which detect chemi-fluorescence for medical and/or bio-testing applications).

The optical navigation device may be used in any suitable devices such as a mobile or smart telephone, other personal or communications devices, a computer, a remote controller, access modules for doors and the like, a camera or any other suitable device.

There are many variations of the present invention which will be appreciated by the person skilled in the art and which are included within the scope of the present invention.

That which is claimed is:

1. A sensor for an optical device comprising:
   an array of pixels, in rows and columns, configured to detect and process illumination thereon to identify inputs generated by a user on a surface of the optical device; and
   a reset circuit configured to provide a second reset period of adjustable length occurring between a black calibration phase and an integration phase in a processing cycle for a frame of each pixel, wherein the period of the second reset period is adjusted based on ambient light conditions.

2. The sensor of claim 1, wherein the ambient light conditions are measured in a preceding frame.

3. The sensor of claim 1, wherein said array of pixels and reset circuit operate in at least two modes including a "Sunlight Mode" and a "Normal Mode".

4. The sensor of claim 3, wherein said array of pixels and reset circuit are switchable between the two modes.

5. The sensor of claim 4, wherein said array of pixels and reset circuit are configured to switch between the "Normal Mode" and the "Sunlight Mode" based on first and second thresholds.

6. The sensor of claim 5, wherein the first threshold is determined from image intensity levels on a pixel.

7. The sensor of claim 5, wherein the first and second thresholds are in hysteresis with one another.

8. The sensor of claim 1, wherein the processing cycle of the frame further includes a first reset and readout phase before the black calibration phase.

9. The sensor of claim 1, wherein the processing cycle of the frame further includes a conversion phase after the second reset phase.

10. An electronic device comprising:
    a sensor including
       an array of pixels, in rows and columns, configured to detect and process illumination thereon to identify inputs generated by a user on a surface of the optical device, and
       a reset circuit configured to provide a second reset period of adjustable length occurring between a black calibration phase and an integration phase in a processing cycle for a frame of each pixel, wherein the period of the second reset period is adjusted based on ambient light conditions.

11. The electronic device of claim 10, wherein the sensor defines a mouse.

12. The electronic device of claim 11, wherein the mouse comprises a fingermouse.

13. The electronic device of claim 10, wherein the electronic device comprises a computer.

14. The electronic device of claim 10, wherein the electronic device comprises a phone.

15. The electronic device of claim 10, wherein the electronic device comprises a camera.

16. The electronic device of claim 10, wherein the electronic device comprises a smart phone.

17. The electronic device of claim 10, wherein the electronic device comprises a remote controller.

18. A method of controlling a sensor for an optical device comprising:
    detecting and processing illumination on an array of pixels, in rows and columns, to identify inputs generated by a user on a surface of the optical device; and
    providing a second reset period of adjustable length occurring between a black calibration phase and an integration phase in a processing cycle for a frame of each pixel, wherein the period of the second reset period is adjusted based on ambient light conditions.

19. The method of claim 18, wherein the ambient light conditions are measured in a preceding frame.

20. The method of claim 18, wherein the sensor operates in at least two modes including a "Sunlight Mode" and a "Normal Mode".

21. The method of claim 20, wherein the sensor is switchable between the two modes.

22. The method of claim 21, wherein the sensor is configured to switch between the "Normal Mode" and the "Sunlight Mode" based on first and second thresholds.

23. The method of claim 18, wherein the processing cycle of the frame further includes a first reset and readout phase before the black calibration phase.

24. The method of claim 18, wherein the processing cycle of the frame further includes a conversion phase after the second reset phase.

* * * * *